United States Patent

[11] 3,609,224

[72] Inventor John Joseph O'Toole
Cherry Hill, N.J.

[21] Appl. No. 809,107
[22] Filed Mar. 21, 1969
[45] Patented Sept. 28, 1971
[73] Assignee RCA Corporation

[54] COLOR TELEVISION VIDEO SIGNAL PROCESSING APPARATUS
15 Claims, 3 Drawing Figs.

[52] U.S. Cl. .......... 178/5.4 R, 330/21
[51] Int. Cl. .......... H04n 5/38
[50] Field of Search .......... 178/5.4 (4 B), 5.4 (4 A), 5.2, 66 A, 5.4 R; 333/76; 330/21, 31, 147

[56] References Cited
UNITED STATES PATENTS

| | | | |
|---|---|---|---|
| 3,167,611 | 1/1965 | St. John .......... | 178/5.4 (4 B) |
| 3,265,810 | 8/1966 | Falk .......... | 178/5.4 (4 B) |

*Primary Examiner*—Robert L. Griffin
*Assistant Examiner*—R. S. Bell
*Attorney*—Eugene M. Whitacre

ABSTRACT: Apparatus is provided for separating portions of color television video signals on a frequency selective basis. First and second frequency component signals are separated by a single resonant circuit and applied to separate processing stages. The processed component signals are recombined to form composite video signals.

INVENTOR
John J. O'Toole
BY Eugene M. Whitacre
ATTORNEY

COLOR TELEVISION VIDEO SIGNAL PROCESSING APPARATUS

BACKGROUND OF THE INVENTION

This invention relates to signal-processing apparatus and particularly to apparatus for separating the frequency components of a signal extending over a band of frequencies, processing the various frequency components separately and recombining the various frequency components without introducing differential phase errors.

Frequently, it is desirable to process various frequency components contained within a band of frequencies separately and then to recombine those frequency components. For example, a composite color television video waveform may contain a luminance signal comprising a first band of frequencies and a chrominance signal comprising a second band of frequencies. In a color television camera chain, the video signals undergo various processing operations between their derivation from the camera and their application to the broadcasting transmitter. Once the chrominance and luminance signal components have been combined it may be desirable to further process these signals separately to adjust their relative gain or to invert the phase of one of the components. The chrominance components are centered around a subcarrier frequency (e.g., of 3.58 MHz. in the NTSC system employed in the United States) and the luminance components are contained within a bandwidth of approximately 4 MHz.

The luminance and chrominance signals occupy the same portion of the spectrum centered around the subcarrier frequency although the signals are interleaved so as not to interfere with each other. It is known that the combined luminance and chrominance signals may be separated on a frequency selective basis for individual processing, a separated quasi-chrominance signal being contained within a portion of the spectrum centered at the subcarrier frequency and a quasi-luminance signal being contained in that proportion of the spectrum not containing the quasi-chrominance signal. The quasi-chrominance signal will contain the higher frequency components of the luminance signal, but these higher frequency components are not an essential portion of every video signal so it is feasible to separate the signals for processing. For purposes of describing the invention, the quasi-chrominance and quasi-luminance signals will be referred to as chrominance and luminance signals, respectively.

In the past, this separation of luminance and chrominance signals has been accomplished by applying the composite video signal to a band pass network containing a parallel resonant circuit and a series resonant circuit each tuned to the subcarrier frequency. The chrominance and luminance signals are separately derived from the series and parallel resonant circuits, respectively. After separation, the signals may be processed separately and then recombined to form the composite video signal. The use of a plurality of tuned circuits to separate these signals presents certain difficulties. For example, it is necessary that the plurality of resonant circuits do not introduce differential phase errors to the luminance and chrominance component signals which will result in undesirable phase distortions of the recombined signals. It is difficult for several tuned circuits to "track" with one another (i.e., to provide identical phase versus frequency characteristics) because in order to do so the circuits must be tuned to precisely the same frequency and the circuits must have identical circuit "Q" factors. To ensure that the plurality of resonant circuits do track, the circuits must be periodically checked and aligned.

It is an object of this invention to provide apparatus for separating a signal containing a band of frequencies into component signals on a frequency selective basis so that the signals may be processed separately and recombined.

According to the invention there is provided apparatus for processing composite signals extending over a band of frequencies. Means are provided for applying composite signals to a band-pass network for separating the composite signals into first and second component signals on a frequency selective basis substantially without introducing differential phase errors. The band-pass network is coupled to first and second signal translating stages such that first frequency component signals are provided by the first signal translating stage and second frequency component signals are provided by the second signal translating stage. The output signals derived from the first and second signal translating stages are recombined to form a processed composite signal.

The invention is more fully described in the following specification taken in conjunction with the accompanying drawing of which:

DESCRIPTION OF THE INVENTION

Figure 1:
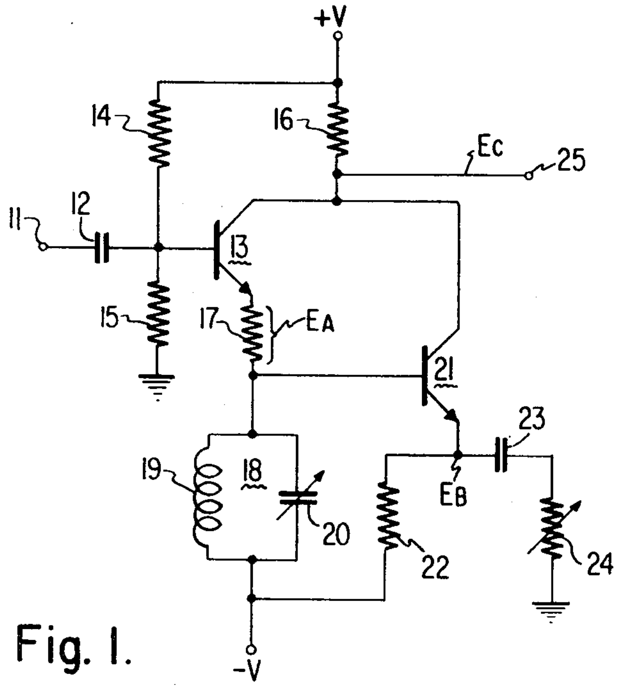
FIG. 1 is a schematic drawing of a circuit embodying the invention.

FIG. 1 illustrates a circuit embodying the invention. A source of signals such as composite color television video signals is coupled to an input terminal 11 and through a coupling capacitor 12 to the base electrode of a transistor 13. Transistor 13 is operated in a common emitter mode. The collector electrode of transistor 13 is coupled through a load resistor 16 to a source of positive voltage (+V). Series connected resistors 14 and 15 are coupled between the source of positive voltage and ground. The junction of resistors 14 and 15 is coupled to the base electrode of transistor 13 and provides a biasing potential for the base electrode. The emitter electrode of transistor 13 is coupled through a resistor 17 to a parallel resonant tuned circuit 18. Tuned circuit 18 comprises an inductance 19 in parallel with a variable capacitor 20. The junction of inductance 19 and capacitor 20 remote from resistor 17 is coupled to a source of negative potential (−V).

The junction of resistor 17 and tuned circuit 18 is coupled to the base electrode of a transistor 21. Transistor 21 is operated in a common emitter mode. The collector electrode of transistor 21 is coupled through load resistor 16 to the source of positive potential. The emitter electrode of transistor 21 is coupled through a resistor 22 to the source of negative potential and through a series connected capacitor 23 and variable resistor 24 to ground. The junction of the collectors of transistors 13 and 21 and load resistor 16 is coupled to an output terminal 25.

In operation, the luminance and chrominance signal components of the composite video signal are applied to the base of transistor 13. Tuned circuit 18 is adjusted to resonance at the color subcarrier frequency (e.g., 3.58 MHz.). Tuned circuit 18 provides a substantial emitter load impedance for the chrominance signal components. However, the frequency response of tuned circuit 18 is selected such that the impedance of circuit 18 for the luminance signal components is less than the impedance of load resistor 16. Therefore, the luminance signal components appear across load resistor 16 while the chrominance signal components alone are supplied to the base of transistor 21.

Figure 2:
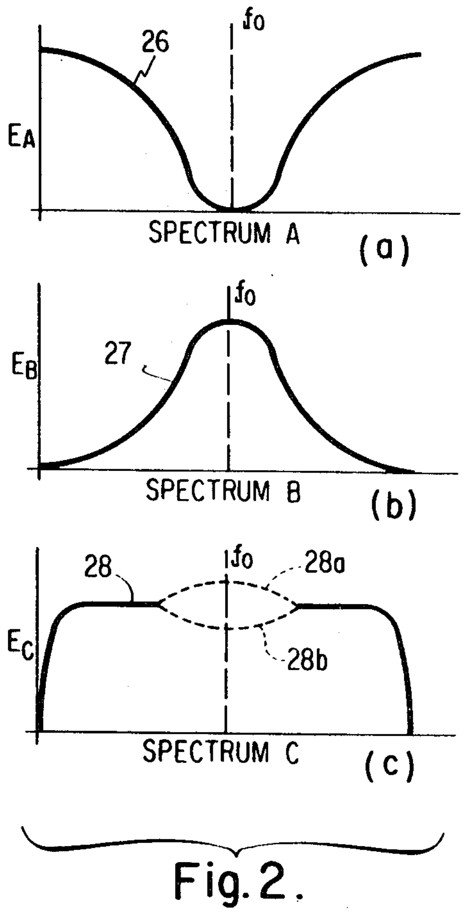
FIG. 2 illustrates the frequency response at various points in the circuit of FIG. 1.

Referring to FIG. 2*a*, the response of transistor 13 to the composite video signals is shown. The effect of the parallel resonant tuned circuit 18 is shown by response curve 26 of FIG. 2*a*. It can be seen that the portion of the video signal spectrum centered around $f_0$, which is 3.58 MHz., is attenuated while the luminance components are not. Thus, the signal provided by transistor 13 appearing at the collector load resistor 16 will be determined according to this response characteristic.

The chrominance signal components developed across parallel resonant tuned circuit 18 are coupled to the base electrode of transistor 21. Response curve 27 of FIG. 2*b* illustrates the response characteristic of the circuit at the emitted electrode of transistor 21. The chrominance signal centered at 3.58 MHz. receives maximum amplification and the response to the luminance signal components is minimum. The signal developed across load resistor 16 by transistor 21 is also determined by this characteristic. Load resistor 16 is common to the collectors of both transistors 13 and 21 so the signals from both transistors 13 and 21 appear across load resistor 16 and are combined at this point. The combined signal appearing across load resistor 16 is coupled to output terminal 25. FIG. *2c* illustrates the overall response of the circuit at output terminal 25.

The single-tuned resonant circuit 18 separates the luminance and chrominance of the composite video signals applied to the base of transistor 13. Thus, since a single-tuned circuit is used for this purpose the sidebands of the luminance and chrominance components must track. The luminance and chrominance signal components recombined in the collector circuits have no differential phase distortion. If resistor 16 is selected to be equal to resistor 17 and resistors 22 and 24 in parallel are equal to resistor 17, the input to output composite video gain is unity. By varying resistor 24 the gain of transistor 21 can be altered and, hence, the gain of the chrominance signal components relative to the luminance components can be controlled. It should be noted that both the luminance and chrominance signal components are inverted in the respective transistor stages 13 and 21 and are in phase when recombined in the collector circuits. FIG. *2c* illustrates the response at output terminal 25 to the composite video signals. Spectrum C of FIG. *2c* is the sum of spectrum A and spectrum B of FIGS. *2a* and *2b*, respectively. The dotted portions **28*a* and 28*b* of responsive curve 28** of FIG. *2c* represent the changes in response which may be achieved by varying the chrominance gain control potentiometer 24.

Figure 3:
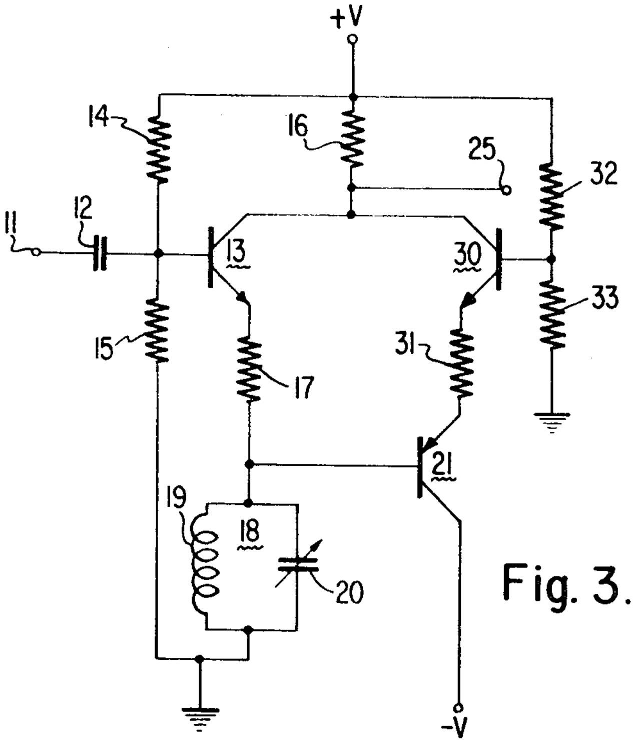
FIG. 3 is a schematic diagram of another circuit embodying the invention.

FIG. 3 illustrates another circuit embodying the invention. Those components in FIG. 3 which perform the same function as their corresponding components in FIG. 1 are represented by the same numbers. The composite color television video signals are applied to the base of transistor 13 through coupling capacitor 12 and are separated in the emitter circuit of transistor 13 by the tuned parallel resonant circuit 18. The luminance components are coupled through the emitter-collector circuit of transistor 13 and appear across the load resistor 16. The chrominance signal components are applied to the base electrode of transistor 21, which is operated in the common collector mode. The chrominance signals appearing at the emitter electrode of transistor 21 are coupled through resistor 31 to the emitter electrode of transistor 30. Transistor 30 is operated as a common base amplifier. Series connected resistors 32 and 33 are coupled between a source of positive voltage and ground. The potential appearing at the junction of resistors 32 and 33 provides bias for the base electrode of transistor 30. The collector electrode of transistor 30 is coupled through load resistor 16 to the source of positive potential. The junction of the collector electrodes of transistors 13 and 30 and common load resistor 16 is coupled to an output terminal 25. The signals in the collector circuit of transistor 13 are inverted with respect to the input video signals coupled to its base electrode. The chrominance signals developed through transistors 21 and 30 and appearing in the collector circuit of transistor 30 are not inverted with respect to the input video signals applied to the base electrode of transistor 13. Thus, the recombined video signals appearing across load resistor 16 have the chrominance signal components inverted with respect to the luminance signal components. The inversion of the chrominance signal with respect to the luminance signal is desirable, for example, when the recombined video signals are applied to a one line delay storage system for replacing video information.

The separation of the luminance and chrominance signal components in the tuned circuit 18 of FIG. 3 is achieved in the same manner as in FIG. 1 previously referred to. Thus, the luminance signal components and chrominance signal components appearing across common load resistor 16 of FIG. 3 track with each other and have no differential phase errors.

Although not shown, it is understood that the gain of transistor stages 21 and 30 of FIG. 3 may be varied so that the chrominance signal components appearing at the collector circuit of transistor 30 may be varied in amplitude with respect to the luminance signal components as well as being phase inverted with respect to the luminance signal components.

What is claimed is:

1. Signal-processing apparatus comprising:
first and second signal translating means having respective first and second input circuits and first and second output circuits;
means for coupling signals extending over a band of frequencies to said first input circuit;
said first input circuit comprising a single resonant circuit for separating said signals such that a first portion of said band of frequencies is applied to said first output circuit;
means for coupling said resonant circuit to said second input circuit such that a second portion of said band of frequencies is applied to said second output circuit; and
means common to said first and second output circuits for developing each of and recombining said first and second portions of said band of frequencies.

2. Signal-processing apparatus according to claim 1 wherein said single resonant circuit is tuned to said second portion of said band of frequencies.

3. Signal-processing apparatus according to claim 2 wherein said first and second signal translators include means for controlling the gain of said signal translators relative to each other.

4. Signal-processing apparatus according to claim 2 wherein said first and second signal translators includes means for inverting the phase of one of said portions of said band of frequencies with respect to the phase of said other portion.

5. Signal-processing apparatus comprising:
a first stage including a transistor having input and output circuits;
a second stage including a transistor having input and output circuits;
means for coupling signals extending over a said band of frequencies to said input circuit of said transistor of said first stage, said input circuit comprising a single resonant circuit for separating said signals on a frequency selective basis such that a first portion of said signals are applied to said output circuit of said transistor of said first stage;
means for coupling said resonant circuit to said input circuit of said transistor of said second stage such that a second portion of said signals are applied to said output circuit of said transistor of said second stage; and
means common to said output circuits of said first and second stages for developing each of and recombining said first and second portions of said signals.

6. Signal-processing apparatus according to claim 5 wherein said signals are coupled to the base electrode of said transistor of said first stage and said single resonant circuit is coupled between the emitter electrode of said transistor and a source of operating potential.

7. Signal-processing apparatus according to claim 6 wherein said means coupled to said output circuits of said first and second stages comprises a load resistor coupled at one end to the collector electrodes of said transistors in said first and second stages and at the other end to a source of operating potential.

8. Signal-processing apparatus according to claim 7 wherein there is a resistor coupled between said emitter electrode of said transistor of said first stage and said single resonant circuit.

9. Signal-processing apparatus according to claim 8 wherein said single resonant circuit comprises a capacitor in parallel with an inductor and wherein said resonant circuit is tuned to a frequency contained within said second portion of said signals.

10. Signal-processing apparatus according to claim 9 wherein said second portion of said signals is coupled to the base electrode of said transistor of said second stage, the emitter electrode of said transistor being coupled to a source of operating potential and to means including a resistor for controlling the gain of said transistor.

11. Apparatus for processing color television video signals comprising:

a source of color television video signals;

first and second gain controlled stages having input and output terminals for processing said video signals;

means coupling said source of video signals to an input terminal of said first gain controlled stage;

a single resonant circuit for separating said video signals into first and second frequency components without introducing differential phase errors;

means coupling said resonant circuit to the input circuits of said gain controlled stages such that said first frequency components are coupled through said first gain controlled stage and said second frequency components are coupled through said second gain controlled stage;

means common to said output terminals of said first and second gain controlled stages together for developing each of and recombining said first and second frequency components obtained from said gain controlled stages; and means coupling said common means to said output terminals of said first and second gain controlled stages.

12. Apparatus for separating and recombining first and second frequency components of a composite signal; comprising:

a first signal translating stage;

means coupling said composite signal to an input circuit of said first signal translating stage;

a single resonant circuit included in the input circuit of said first signal translating stage for providing degeneration for said second frequency components such that only components of said composite signal other than said second frequency components are translated through said first stage;

a second signal translating stage having the input circuit thereof coupled to said single resonant circuit for passing said second frequency components through said second stage; and means common to the output circuits of said first and second signal translating stages for developing and recombining said first and second frequency components.

13. Apparatus according to claim 12 wherein said first signal translating stage includes a transistor operated in the common emitter mode and said single resonant circuit is coupled in the emitter circuit thereof for providing degeneration for said second frequency components.

14. Apparatus according to claim 13 wherein said second signal translating stage includes a transistor operated in the common emitter mode and having its base circuit coupled to said single resonant circuit and wherein said means common to said first and second signal translating stages includes a common load resistor coupled to the collector electrodes of said transistors.

15. Apparatus according to claim 13 wherein said second signal translating stage includes the cascade arrangement of first and second transistors operated in the common collector and common base modes, respectively, and wherein the base electrode of said first transistor is coupled to said single resonant circuit and the collector electrode of said second transistor is coupled to said means common to said output circuits of said first and second signal translating stages.